United States Patent
Sun et al.

(10) Patent No.: US 8,692,524 B2
(45) Date of Patent: Apr. 8, 2014

(54) DC-TO-DC CONVERSION APPARATUS

(75) Inventors: Ju-Lu Sun, Nanjing (CN); Bo Ma, Nanjing (CN); Ming Xu, Nanjing (CN)

(73) Assignees: FSP Technology Inc., Taoyuan County (TW); FSP-Powerland Technology Inc., Nanjing (CN)

( * ) Notice: Subject to any disclaimer, the term of this patent is extended or adjusted under 35 U.S.C. 154(b) by 49 days.

(21) Appl. No.: 13/450,434

(22) Filed: Apr. 18, 2012

(65) Prior Publication Data

US 2012/0268097 A1 Oct. 25, 2012

(30) Foreign Application Priority Data

Apr. 20, 2011 (CN) ........................ 2011 2 0116407 U

(51) Int. Cl.
*H02M 3/158* (2006.01)

(52) U.S. Cl.
USPC ........................... 323/225; 323/222; 323/299

(58) Field of Classification Search
USPC ............ 323/225, 271, 272, 222, 299; 307/43, 307/72, 75, 82
See application file for complete search history.

(56) References Cited

U.S. PATENT DOCUMENTS 8,228,690 B2 *  7/2012  Watanabe et al. ............... 363/16
8,476,879 B2 *  7/2013  Gaboury et al. .............. 323/272

* cited by examiner

*Primary Examiner* — Gary L Laxton
(74) *Attorney, Agent, or Firm* — Jianq Chyun IP Office

(57) ABSTRACT

A direct current (DC)-to-DC conversion apparatus is provided. The provided DC-to-DC conversion apparatus is composed of two boost circuits, in which inputs of both boost circuits are connected in parallel, and outputs of both boost circuits are connected in series. Accordingly, when the provided DC-to-DC conversion apparatus is operated, the DC input power would be firstly sampled and determined, and then the operations of the first and the second switch devices disposed therein would be controlled in response to the sampled-determined result, such that both boost circuits would be respectively operated in different input conditions, for example, the input is normally-connected or the input is reverse-connected. Accordingly, regardless of the input of normal connection or the input of reverse connection, the provided DC-to-DC conversion apparatus can perform the function of DC-to-DC conversion, thereby enabling the applied product to be normally operated even the input is reverse-connected.

13 Claims, 4 Drawing Sheets (a)

(b)

(a)

(b)

DC-TO-DC CONVERSION APPARATUS

CROSS-REFERENCE TO RELATED APPLICATION

This application claims the priority benefit of China application serial no. 201120116407.2, filed on Apr. 20, 2011. The entirety of the above-mentioned patent application is hereby incorporated by reference herein and made a part of this specification.

BACKGROUND OF THE INVENTION

1. Field of the Invention

The present invention relates to a direct current (DC)-to-DC conversion technology, more particularly, to a boost-based DC-to-DC conversion apparatus with an input of anti-reverse connection function.

2. Description of the Related Art

A DC-to-DC converter is used as a voltage converter for converting an input DC voltage into an effective fixed output voltage, and the DC-to-DC converter is widely applied in multiple products such as cellular phones, MP3, digital cameras, portable media players, etc.

In recent, most of DC-to-DC converters have an input of anti-reverse connection function, and two kinds of implementations for achieving the input of anti-reverse connection function are generally used. The first one is shown in FIG. 1, in which an input of anti-reverse connection circuit is used. To be specific, the input of anti-reverse connection circuit is constituted by a fuse F and a diode D1, and located at an input of initiating terminal. In this case, the anode of the diode D1 is coupled to the ground potential, and the cathode of the diode is coupled to the positive input terminal (+). When the input is reverse-connected, the diode D1 is fast conducted, such that the fuse F is burned out, and thus protecting the corresponding load. The other one is shown in FIG. 2, in which the power supply VCC provides a threshold voltage of the gate of the MOS transistor G1 through the resistor R1, and the serially-connected resistor R1 is used for current limiting. In this case, when the power supply VCC is normally inputted, the MOS transistor G1 is turned-on, such that a normal operation is activated due to a complete circuit loop is formed. On the contrary, when the input power VCC is reverse-connected, the MOS transistor G1 is turned-off due to the drain voltage of the MOS transistor is much larger than the source voltage of the MOS transistor, such that a protection mechanism is activated.

By using the aforementioned two kinds of implementations for achieving the input of anti-reverse connection function, when the input is reverse-connected, the protection mechanism is activated to protect the applied circuit due to fuse F is burned out or the MOS transistor G1 is turned-off. Obviously, when the input is reverse-connected, the complete circuit loop is cut-off, such that the applied product is inactivated.

SUMMARY OF THE INVENTION

The present invention is directed to a DC-to-DC conversion apparatus for solving the problem recited in the "Related art", namely, when the input is reverse-connected, the complete circuit loop is cut-off, such that the applied product is inactivated.

An exemplary embodiment of the present invention provides a DC-to-DC conversion apparatus, and which enables the applied product to be normally operated even the input is reverse-connected.

An exemplary embodiment of the present invention provides a DC-to-DC conversion apparatus, and which includes a first input terminal, a second input terminal, an output terminal, an output capacitor, an inductor, a first diode, a second diode, a first switch device and a second switch device. The first input terminal and the second input terminal both are used for receiving a DC input power. The output terminal is used for outputting a converted DC output power.

A first terminal of the output capacitor is coupled the output terminal, and a second terminal of the output capacitor is coupled to a ground potential. A first terminal of the inductor is coupled to the first input terminal. An anode of the first diode is coupled to a second terminal of the inductor, and a cathode of the first diode is coupled to the output terminal. An anode of the second diode is coupled to the second input terminal, and a cathode of the second diode is coupled to the output terminal.

A first terminal of the first switch device is coupled to the ground potential, a second terminal of the first switch device is coupled to the second terminal of the inductor, and a control terminal of the first switch device is used for receiving a first pulse width modulation (PWM) signal. A first terminal of the second switch device is coupled to the ground potential, a second terminal of the second switch device is coupled to the second input terminal, and a control terminal of the second switch device is used for receiving a second PWM signal.

According to an exemplary embodiment of the present invention, the provided DC-to-DC conversion apparatus may further includes a control circuit. The control circuit is coupled to the control terminals of the first and the second switch devices, and used for generating the first and the second PWM signals in response to a first sampling voltage and a second sampling voltage, so as to control operations of the first and the second switch devices.

According to an exemplary embodiment of the present invention, the provided DC-to-DC conversion apparatus may further includes a first sampling circuit and a second sampling circuit. The first sampling circuit is coupled to the first input terminal, and used for receiving and sampling a first DC input voltage of the DC input power, so as to output the first sampling voltage. The second sampling circuit is coupled to the second input terminal, and used for receiving and sampling a second DC input voltage of the DC input power, so as to output the second sampling voltage.

According to an exemplary embodiment of the present invention, the first sampling circuit includes a first resistor, a first input capacitor and a third diode. A first terminal of the first resistor is coupled to the first input terminal. A first terminal of the first input capacitor is coupled to a second terminal of the first resistor, and a second terminal of the first input capacitor is coupled to the ground potential. An anode of the third diode is coupled to the second terminal of the first resistor and a cathode of the third diode is used for outputting the first sampling voltage. In this case, the second sampling circuit includes a second resistor, a second input capacitor and a fourth diode. A first terminal of the second resistor is coupled to the second input terminal. A first terminal of the second input capacitor is coupled to a second terminal of the second resistor, and a second terminal of the second input capacitor is coupled to the ground potential. An anode of the fourth diode is coupled to the second terminal of the second resistor, and a cathode of the fourth diode is used for outputting the second sampling voltage.

According to another exemplary embodiment of the present invention, the first sampling circuit includes a first resistor and a second resistor. A first terminal of the first resistor is coupled to the first input terminal, and a second terminal of the first resistor is used for outputting the first sampling voltage. A first terminal of the second resistor is coupled to the second terminal of the first resistor, and a second terminal of the second resistor is coupled to the ground potential. In this case, the second sampling circuit includes a third resistor and a fourth resistor. A first terminal of the third resistor is coupled to the second input terminal, and a second terminal of the third resistor is used for outputting the second sampling voltage. A first terminal of the fourth resistor is coupled to the second terminal of the third resistor, and a second terminal of the fourth resistor is coupled to the ground potential.

According to an exemplary embodiment of the present invention, the control circuit is further used for comparing the first sampling voltage with the second sampling voltage.

According to an exemplary embodiment of the present invention, when the first sampling voltage is greater than the second sampling voltage, the first switch device is alternately turned-on and turned-off in response to the first PWM signal generated by the control circuit, and the second switch device is continuously turned-on in response to the second PWM signal generated by the control circuit. In this case, a boost circuit is constituted by the inductor, the first switch device, the first diode and the output capacitor, and used for performing a function of DC-to-DC conversion.

According to an exemplary embodiment of the present invention, when the first sampling voltage is smaller than the second sampling voltage, the first switch device is continuously turned-on in response to the first PWM signal generated by the control circuit, and the second switch device is alternately turned-on and turned-off in response to the second PWM signal generated by the control circuit. In this case, a boost circuit is constituted by the inductor, the second switch device, the second diode and the output capacitor, and used for performing a function of DC-to-DC conversion.

According to an exemplary embodiment of the present invention, the first and the second switch devices may be any type of switches, such as MOSFETs, IGBTs, or the like.

From the above, the provided DC-to-DC conversion apparatus is composed of two boost circuits, in which inputs of both boost circuits are connected in parallel, and outputs of both boost circuits are connected in series. Accordingly, when the provided DC-to-DC conversion apparatus is operated, the DC input power would be firstly sampled and determined, and then the operations of the first and the second switch devices would be controlled in response to the sampled-determined result, such that both boost circuits would be respectively operated in different input conditions, for example, the input is normally-connected or the input is reverse-connected. Accordingly, regardless of the input of normal connection or the input of reverse connection, the provided DC-to-DC conversion apparatus can perform the function of DC-to-DC conversion, thereby enabling the applied product to be normally operated even the input is reverse-connected, and further solving the problem recited in the "Related Art", namely, the applied product is inactivated in response to the input of reverse connection.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
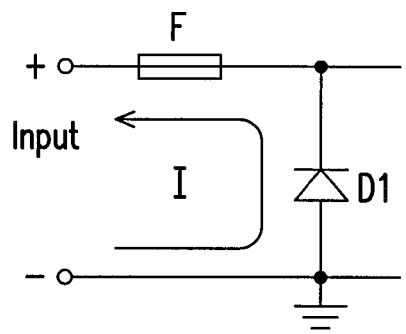
FIG. 1 is a circuit diagram of an input of anti-reverse connection circuit in an existing DC-to-DC converter.
Figure 2:
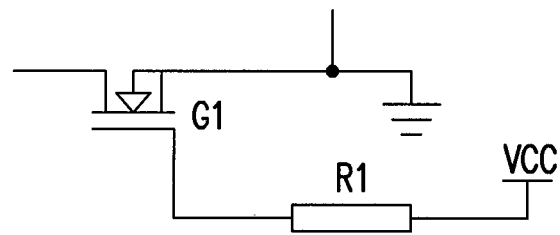
FIG. 2 is a circuit diagram of an input of anti-reverse connection circuit in another existing DC-to-DC converter.

Reference will now be made in detail to the present preferred embodiments of the invention, examples of which are illustrated in the accompanying drawings. Wherever possible, the same reference numbers are used in the drawings and the description to refer to the same or like parts.

Figure 3:
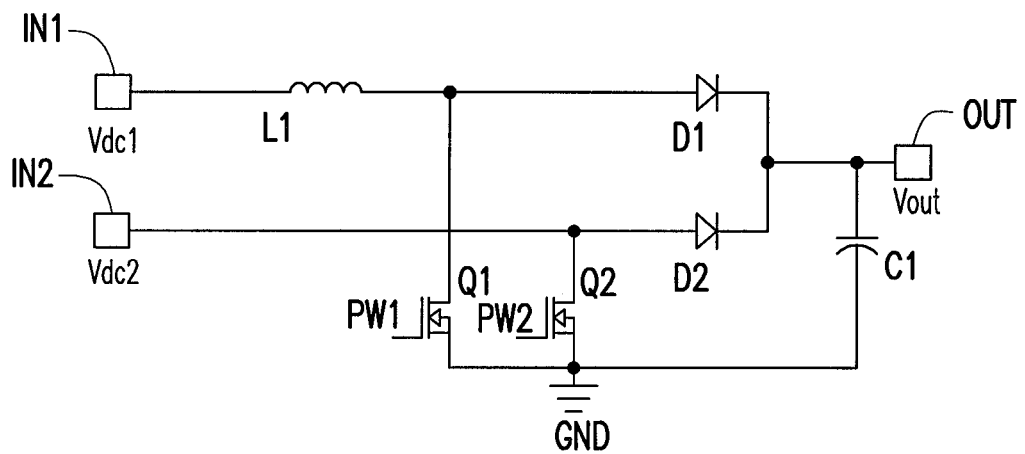
FIG. 3 is a circuit diagram of two boost circuits in a DC-to-DC conversion apparatus according to an exemplary embodiment of the present invention.

FIG. 3 is a circuit diagram of two boost circuits in a DC-to-DC conversion apparatus according to an exemplary embodiment of the present invention. Referring to FIG. 3, the DC-to-DC conversion apparatus of the exemplary embodiment includes a first input terminal IN1, a second input terminal IN2, an output terminal OUT, an output capacitor C1, an inductor L1, a first diode D1, a second diode D2, a first switch device Q1 and a second switch device Q2. Both the first input terminal IN1 and the second input terminal IN2 of the DC-to-DC conversion apparatus are used for receiving a DC input power (for example, a first DC input voltage Vdc1 and a second DC input voltage Vdc2). The output terminal OUT of the DC-to-DC conversion apparatus is used for outputting a converted DC output power Vout. A first terminal of the output capacitor C1 is coupled to the output terminal OUT of the DC-to-DC conversion apparatus, and a second terminal of the output capacitor C1 is coupled to a ground potential.

A first terminal of the inductor L1 is coupled to the first input terminal IN1 of the DC-to-DC conversion apparatus. An anode of the first diode D1 is coupled to a second terminal of the inductor L1, and a cathode of the first diode D1 is coupled to the output terminal OUT of the DC-to-DC conversion apparatus. An anode of the second diode D2 is coupled to the second input terminal IN2 of the DC-to-DC conversion apparatus, and a cathode of the second diode D2 is coupled to the output terminal OUT of the DC-to-DC conversion apparatus.

A first terminal of the first switch device Q1 is coupled to the ground potential, a second terminal of the first switch device Q1 is coupled to the second terminal of the inductor L1, and a control terminal of the first switch device Q1 is used for receiving a first pulse width modulation (PWM) signal PW1. A first terminal of the second switch device Q2 is coupled to the ground potential, a second terminal of the second switch device Q2 is coupled to the second input terminal IN2 of the DC-to-DC conversion apparatus, and a control terminal of the second switch device Q2 is used for receiving a second PWM signal PW2.

In the exemplary embodiment, the first switch device Q1 and the second switch device Q2 may be any type of switches/devices which can be controlled to be turned-on and turned-off alternately, for example, metal-oxide-semiconductor field-effect-transistors (MOSFETs), insulated gate bipolar transistors (IGBTs), or the like. As show in FIG. 3, the first switch device Q1 and the second switch device Q2 are implemented by MOSFETs, such that the operation states and principle of the DC-to-DC conversion apparatus would be explained as below.

Figure 4:
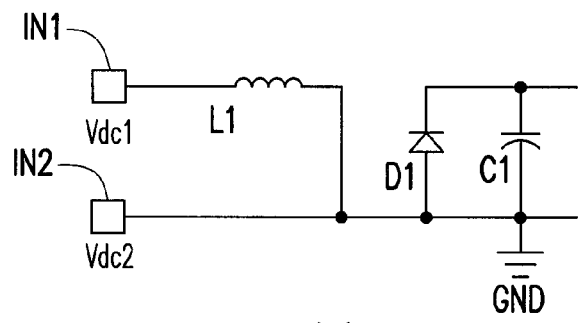
FIG. 4 is an operation diagram of both boost circuits of FIG. 3 under a first operation state.
Figure 4:
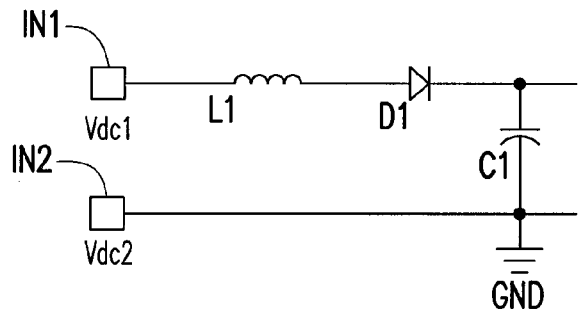

FIG. 4 is an operation diagram of both boost circuits of FIG. 3 under a first operation state. Referring to FIGS. 3 and 4, when the first DC input voltage Vdc1 is positive, and the second DC input voltage Vdc2 is negative, to make that the first switch device Q1 is alternately turned-on and turned-off in response to the first PWM signal PW1, and the second switch device Q2 is continuously turned-on. In this case, a first boost circuit is constituted by the inductor L1, the first switch device Q1, the first diode D1 and the output capacitor C1. Since the first switch device Q1 is alternately turned-on and turned-off in response to the first PWM signal PW1, and the second switch device Q2 is continuously turned-on, such that when the first switch device Q1 is turned-on, as shown in FIG. 4(a), the inductor L1 stores energy, and the inductor current ($i_{L1}$) is increased, meanwhile, the first diode D1 is cut-off. Moreover, when the first switch device Q1 is turned-off, as shown in FIG. 4(b), the first diode D1 is conducted, and the output capacitor C1 is thus charged.

Figure 5:
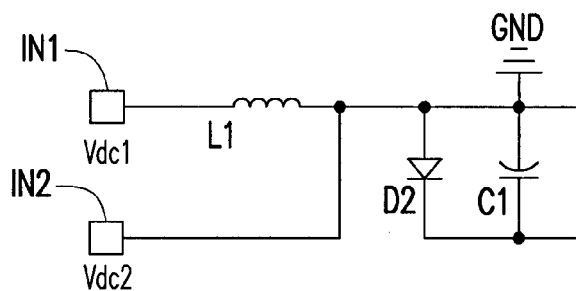
FIG. 5 is an operation diagram of both boost circuits of FIG. 3 under a second operation state.
Figure 5:
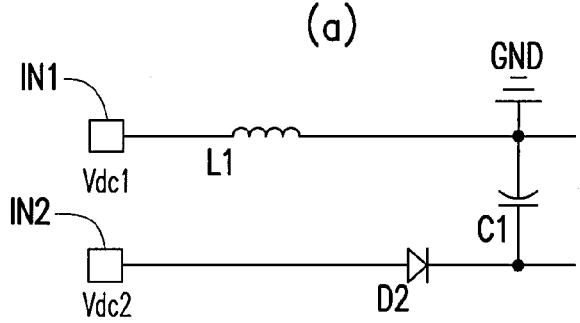

On the contrary, when the first DC input voltage Vdc1 is negative, and the second DC input voltage Vdc2 is positive, to make that the first switch device Q2 is alternately turned-on and turned-off in response to the second PWM signal PW2, and the first switch device Q1 is continuously turned-on. In this case, a second boost circuit is constituted by the inductor L1, the second switch device Q2, the second diode D2 and the output capacitor C1. Since the second switch device Q2 is alternately turned-on and turned-off in response to the second PWM signal PW2, and the first switch device Q1 is continuously turned-on, such that when the second switch device Q2 is turned-on, as shown in FIG. 5(a), the inductor L1 stores energy, and the inductor current ($i_{L1}$) is increased, meanwhile, the second diode D2 is cut-off. Moreover, when the second switch device Q2 is turned-off, as shown in FIG. 5(b), the second diode D2 is conducted, and the output capacitor C1 is thus charged.

Accordingly, regardless of the input (IN1(Vdc1), IN2(Vdc2)) of normal connection or the input (IN1(Vdc1), IN2(Vdc2)) of reverse connection, both boost circuits of the DC-to-DC conversion apparatus can be normally operated to perform the function of DC-to-DC conversion.

Figure 6:
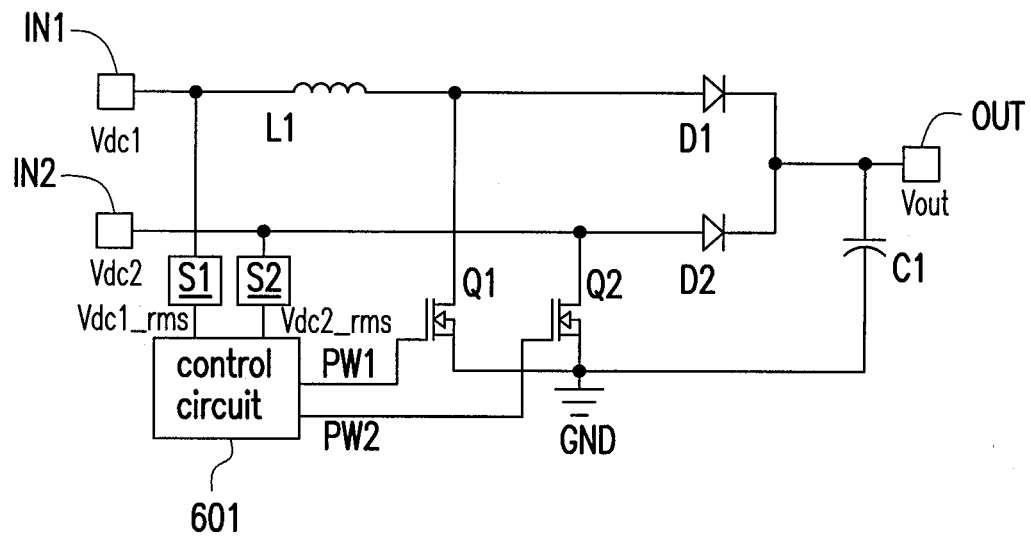
FIG. 6 is an implementation of the DC-to-DC conversion apparatus according to an exemplary embodiment of the present invention.

To be specific, FIG. 6 is an implementation of the DC-to-DC conversion apparatus according to an exemplary embodiment of the present invention. Referring to FIG. 6, compared with FIG. 3, the DC-to-DC conversion apparatus shown in FIG. 6 further includes a control circuit 601, a first sampling circuit S1 and a second sampling circuit S2. The control circuit 601 is coupled to the control terminals of the first and the second switch devices Q1 and Q2, and used for generating the first PWM signal PW1 and the second PWM signal PW2 in response to a first sampling voltage Vdc1_rms and a second sampling voltage Vdc2_rms respectively from the first and the second sampling circuits S1 and S2, so as to control the operations of the first and the second switch devices Q1 and Q2.

In addition, the first sampling circuit S1 is coupled to the first input terminal N1 of the DC-to-DC conversion apparatus, and used for receiving and sampling the first DC input voltage Vdc1 of the DC input power, so as to output the first sampling voltage Vdc1_rms to the control circuit 601. The second sampling circuit S2 is coupled to the second input terminal N2 of the DC-to-DC conversion apparatus, and used for receiving and sampling the second DC input voltage Vdc2 of the DC input power, so as to output the second sampling voltage Vdc2_rms to the control circuit 601. In the exemplary embodiment, the first sampling voltage Vdc1_rms is the root-mean-square (RMS) value of the first DC input voltage Vdc1, and the second sampling voltage Vdc2_rms is the RMS value of the second DC input voltage Vdc2.

Furthermore, in the exemplary embodiment, the control circuit 601 is further used for comparing the first sampling voltage Vdc1_rms with the second sampling voltage Vdc2_rms. When the first sampling voltage Vdc1_rms is greater than the second sampling voltage Vdc2_rms by the comparison of the control circuit 601, the first switch device Q1 is alternately turned-on and turned-off in response to the first PWM signal PW1 generated by the control circuit 601, and the second switch device Q2 is continuously turned-on in response to the second PWM signal PW2 generated by the control circuit 601. On the contrary, when the first sampling voltage Vdc1_rms is smaller than the second sampling voltage Vdc2_rms by the comparison of the control circuit 601, the first switch device Q1 is continuously turned-on in response to the first PWM signal PW1 generated by the control circuit 601, and the second switch device Q2 is alternately turned-on and turned-off in response to the second PWM signal PW2 generated by the control circuit 601.

Figure 7:
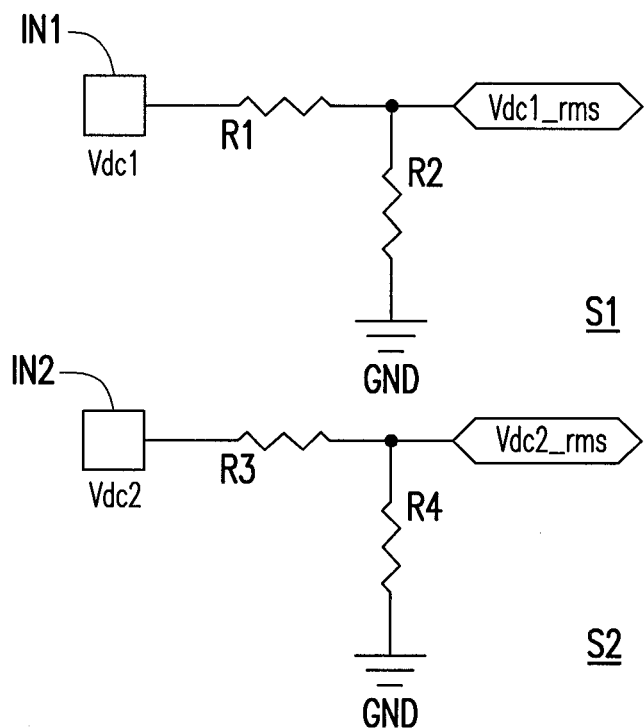
FIG. 7 is an implementation of a first sampling circuit and a second sampling circuit in the DC-to-DC conversion apparatus of FIG. 6 according to an exemplary embodiment of the present invention.

On the other hand, FIG. 7 is an implementation of the first sampling circuit S1 and the second sampling circuit S2 in the DC-to-DC conversion apparatus of FIG. 6 according to an exemplary embodiment of the present invention. As shown in FIG. 7, the first sampling circuit S1 includes resistors R1 and R2. A first terminal of the resistor R1 is coupled to the first input terminal IN1 of the DC-to-DC conversion apparatus, and a second terminal of the resistor R1 is used for outputting the first sampling voltage Vdc1_rms to the control circuit 601. A first terminal of the resistor R2 is coupled to the second terminal of the resistor R1, and a second terminal of the resistor R2 is coupled to the ground potential.

In addition, the second sampling circuit S2 includes resistors R3 and R4. A first terminal of the resistor R3 is coupled to the second input terminal IN2 of the DC-to-DC conversion apparatus, and a second terminal of the resistor R3 is used for outputting the second sampling voltage Vdc2_rms to the control circuit 601. A first terminal of the resistor R4 is coupled to the second terminal of the resistor R3, and a second terminal of the resistor R4 is coupled to the ground potential.

Herein, it should be noted that the implementations of the first and the second sampling circuit S1 and S2 are specifically suitable for the stable DC input power.

Figure 8:
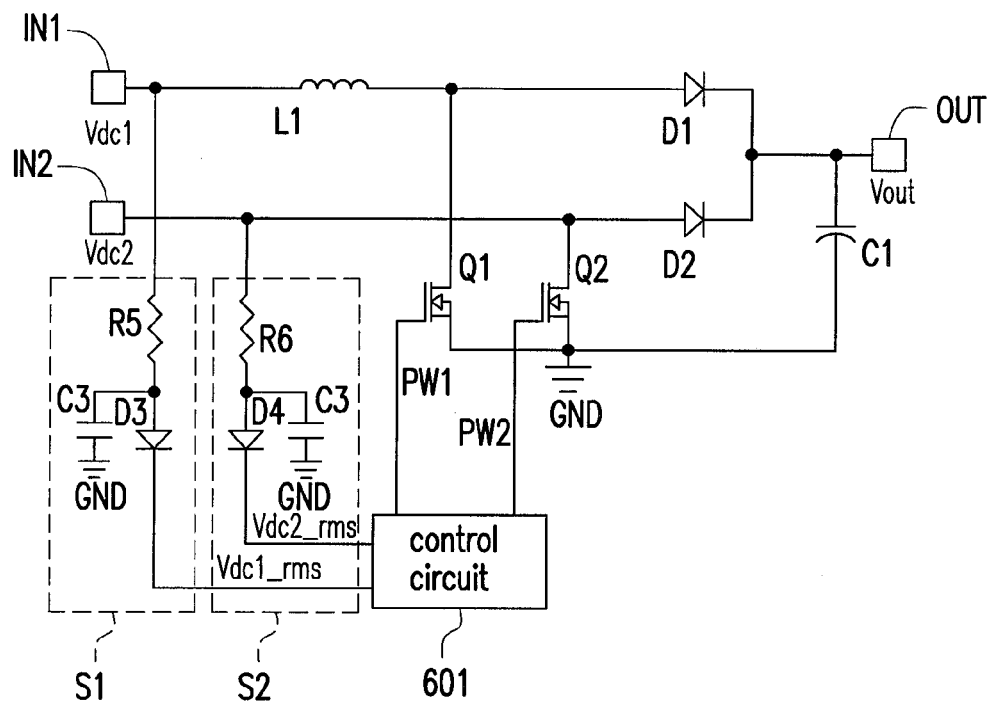
FIG. 8 is an implementation of a first sampling circuit and a second sampling circuit in the DC-to-DC conversion apparatus of FIG. 6 according to another exemplary embodiment of the present invention.

Besides, FIG. 8 is an implementation of the first sampling circuit S1 and the second sampling circuit S2 in the DC-to-DC conversion apparatus of FIG. 6 according to another exemplary embodiment of the present invention. As shown in FIG. 8, the first sampling circuit S1 includes a resistor R5, an input capacitor C2 and a diode D3. A first terminal of the resistor R5 is coupled to the first input terminal IN1 of the DC-to-DC conversion apparatus. A first terminal of the input capacitor C2 is coupled to a second terminal of the resistor R5, and a second terminal of the input capacitor C2 is coupled to the ground potential. An anode of the diode D3 is coupled to the second terminal of the resistor R5, and a cathode of the diode D3 is used for outputting the first sampling voltage Vdc1_rms to the control circuit 601.

In addition, the first sampling circuit S2 includes a resistor R6, an input capacitor C3 and a diode D4. A first terminal of the resistor R6 is coupled to the second input terminal IN2 of the DC-to-DC conversion apparatus. A first terminal of the input capacitor C3 is coupled to a second terminal of the resistor R6, and a second terminal of the input capacitor C3 is coupled to the ground potential. An anode of the diode D4 is coupled to the second terminal of the resistor R6, and a cathode of the diode D4 is used for outputting the second sampling voltage Vdc2_rms to the control circuit 601.

In the exemplary embodiment as shown in FIG. 8, the first and the second sampling circuits S1 and S2 are RC filtering-sampling circuits. In this case, the first DC input voltage Vdc1 and the second DC input voltage Vdc2 can be respectively sampled by the RC filtering-sampling circuits S1 and S2 regardless of whether the input is the stable DC input power or not, such that the outputted sampling voltage Vdc1_rms and Vdc2_rms are the stable RMS values of the DC input power (Vdc1, Vdc2).

Figure 9:
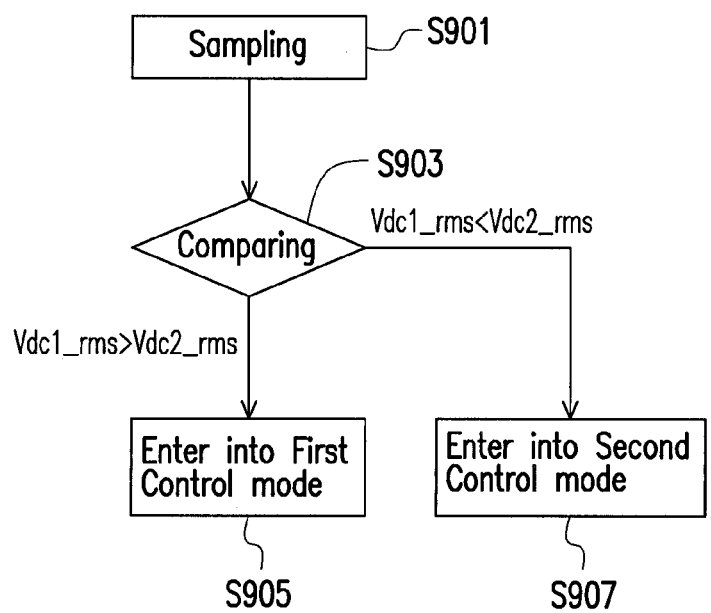
FIG. 9 is a control diagram of the DC-to-DC conversion apparatus of FIG. 6.

From the above, FIG. 9 is a control diagram of the DC-to-DC conversion apparatus of FIG. 6. Referring to FIGS. 6 and 9, during the DC input power (Vdc1, Vdc2) is inputted into the DC-to-DC conversion apparatus, the first and the second sampling circuits S1 and S2 respectively receive and sample the first DC input voltage Vdc1 and the second DC input voltage Vdc2 (Step S901), so as to provide and output the first sampling voltage Vdc1_rms and the second sampling voltage Vdc2_rms to the control circuit 601. Then, the control circuit 601 compares the first sampling voltage Vdc1_rms with the second sampling voltage Vdc2_rms (Step S903).

When the first sampling voltage Vdc1_rms is greater than the second sampling voltage Vdc2_rms by the comparison of the control circuit 601, the control circuit 601 determines entering into a first control mode (Step S905), namely, the first switch device Q1 is alternately turned-on and turned-off in response to the first PWM signal PW1 generated by the control circuit 601, and the second switch device Q2 is continuously turned-on in response to the second PWM signal PW2 generated by the control circuit 601. In this case, the first boost circuit is constituted by the inductor L1, the first switch device Q1, the first diode D1 and the output capacitor C1, and used for performing the function of DC-to-DC conversion.

When the first sampling voltage Vdc1_rms is smaller than the second sampling voltage Vdc2_rms by the comparison of the control circuit 601, the control circuit 601 determines entering into a second control mode (Step S907), namely, the second switch device Q2 is alternately turned-on and turned-off in response to the second PWM signal PW2 generated by the control circuit 601, and the first switch device Q1 is continuously turned-on in response to the first PWM signal PW1 generated by the control circuit 601. In this case, the second boost circuit is constituted by the inductor L1, the second switch device Q2, the second diode D2 and the output capacitor C1, and used for performing the function of DC-to-DC conversion.

In summary, the provided DC-to-DC conversion apparatus is composed of two boost circuits, in which inputs of both boost circuits are connected in parallel, and outputs of both boost circuits are connected in series. Accordingly, when the provided DC-to-DC conversion apparatus is operated, the DC input power would be firstly sampled and determined, and then the operations of the first and the second switch devices would be controlled in response to the sampled-determined result, such that both boost circuits would be respectively operated in different input conditions, for example, the input is normally-connected or the input is reverse-connected. Accordingly, regardless of the input of normal connection or the input of reverse connection, the provided DC-to-DC conversion apparatus can perform the function of DC-to-DC conversion, thereby enabling the applied product to be normally operated even the input is reverse-connected, and further solving the problem recited in the "Related Art", namely, the applied product is inactivated in response to the input of reverse connection.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A direct-current (DC)-to-DC conversion apparatus, comprising:
    a first input terminal and a second input terminal both used for receiving a DC input power;
    an output terminal used for outputting a converted DC output power;
    an output capacitor, having a first terminal coupled the output terminal and a second terminal coupled to a ground potential;
    an inductor, having a first terminal coupled to the first input terminal;
    a first diode, having an anode coupled to a second terminal of the inductor and a cathode coupled to the output terminal;
    a second diode, having an anode coupled to the second input terminal and a cathode coupled to the output terminal;
    a first switch device, having a first terminal coupled to the ground potential, a second terminal coupled to the second terminal of the inductor, and a control terminal receiving a first pulse width modulation (PWM) signal; and
    a second switch device, having a first terminal coupled to the ground potential, a second terminal coupled to the second input terminal, and a control terminal receiving a second PWM signal,
    wherein when a voltage of the DC input power received by one of the first input terminal and the second input terminal is positive, a voltage of the DC input power received by the other one of the first input terminal and the second input terminal is negative,
    wherein when the voltage of the DC input power received by the first input terminal is positive, the first switch device is alternately turned-on and turned-off in response to the first PWM signal, and the second switch device is continuously turned-on in response to the second PWM signal,
    wherein when the voltage of the DC input power received by the second input terminal is positive, the first switch device is continuously turned-on in response to the first PWM signal, and the second switch device is alternately turned-on and turned-off in response to the second PWM signal.

2. The DC-to-DC conversion apparatus according to claim 1, further comprising:
    a control circuit, coupled to the control terminals of the first and the second switch devices, for generating the first and the second PWM signals in response to a first sampling voltage and a second sampling voltage, so as to control operations of the first and the second switch devices.

3. The DC-to-DC conversion apparatus according to claim 2, further comprising:
   a first sampling circuit, coupled to the first input terminal, for receiving and sampling a first DC input voltage of the DC input power, so as to output the first sampling voltage; and
   a second sampling circuit, coupled to the second input terminal, for receiving and sampling a second DC input voltage of the DC input power, so as to output the second sampling voltage.

4. The DC-to-DC conversion apparatus according to claim 3, wherein the first sampling circuit comprises:
   a first resistor, having a first terminal coupled to the first input terminal;
   a first input capacitor, having a first terminal coupled to a second terminal of the first resistor and a second terminal coupled to the ground potential; and
   a third diode, having an anode coupled to the second terminal of the first resistor and a cathode outputting the first sampling voltage.

5. The DC-to-DC conversion apparatus according to claim 4, wherein the second sampling circuit comprises:
   a second resistor, having a first terminal coupled to the second input terminal;
   a second input capacitor, having a first terminal coupled to a second terminal of the second resistor and a second terminal coupled to the ground potential; and
   a fourth diode, having an anode coupled to the second terminal of the second resistor and a cathode outputting the second sampling voltage.

6. The DC-to-DC conversion apparatus according to claim 3, wherein the first sampling circuit comprises:
   a first resistor, having a first terminal coupled to the first input terminal and a second terminal outputting the first sampling voltage; and
   a second resistor, having a first terminal coupled to the second terminal of the first resistor and a second terminal coupled to the ground potential.

7. The DC-to-DC conversion apparatus according to claim 6, wherein the second sampling circuit comprises:
   a third resistor, having a first terminal coupled to the second input terminal and a second terminal outputting the second sampling voltage; and
   a fourth resistor, having a first terminal coupled to the second terminal of the third resistor and a second terminal coupled to the ground potential.

8. The DC-to-DC conversion apparatus according to claim 3, wherein the control circuit is further used for comparing the first sampling voltage with the second sampling voltage.

9. The DC-to-DC conversion apparatus according to claim 8, wherein when the first sampling voltage is greater than the second sampling voltage, the first switch device is alternately turned-on and turned-off in response to the first PWM signal generated by the control circuit, and the second switch device is continuously turned-on in response to the second PWM signal generated by the control circuit.

10. The DC-to-DC conversion apparatus according to claim 9, wherein a boost circuit is constituted by the inductor, the first switch device, the first diode and the output capacitor, and used for performing a function of DC-to-DC conversion.

11. The DC-to-DC conversion apparatus according to claim 8, wherein when the first sampling voltage is smaller than the second sampling voltage, the first switch device is continuously turned-on in response to the first PWM signal generated by the control circuit, and the second switch device is alternately turned-on and turned-off in response to the second PWM signal generated by the control circuit.

12. The DC-to-DC conversion apparatus according to claim 11, wherein a boost circuit is constituted by the inductor, the second switch device, the second diode and the output capacitor, and used for performing a function of DC-to-DC conversion.

13. The DC-to-DC conversion apparatus according to claim 1, wherein the first and the second switch devices are implemented by MOSFETs.

* * * * *